(12) United States Patent
Coache

(10) Patent No.: US 12,090,906 B2
(45) Date of Patent: Sep. 17, 2024

(54) PORTABLE TABLE SYSTEM FOR MOUNTING WITHIN A VEHICLE TO PROVIDE A WORKSPACE WITHIN THE VEHICLE

(71) Applicant: Claude M. Coache, Pompano Beach, FL (US)

(72) Inventor: Claude M. Coache, Pompano Beach, FL (US)

(*) Notice: Subject to any disclaimer, the term of this patent is extended or adjusted under 35 U.S.C. 154(b) by 183 days.

(21) Appl. No.: 17/967,578

(22) Filed: Oct. 17, 2022

(65) Prior Publication Data
US 2023/0373371 A1 Nov. 23, 2023

Related U.S. Application Data

(60) Provisional application No. 63/344,753, filed on May 23, 2022.

(51) Int. Cl.
*B60N 3/00* (2006.01)

(52) U.S. Cl.
CPC .................. *B60N 3/001* (2013.01)

(58) Field of Classification Search
CPC ...... B60N 3/001; A47B 21/03; A47B 21/0314
USPC ..................................... 108/44, 45
See application file for complete search history.

(56) References Cited

U.S. PATENT DOCUMENTS

| | | | | |
|---|---|---|---|---|
| 4,946,120 A * | 8/1990 | Hatcher | ............ | B60R 11/0252 297/188.21 |
| 5,485,793 A * | 1/1996 | Crowell | ................ | A47B 23/04 108/44 |
| 6,382,745 B1 * | 5/2002 | Adkins | ................ | B60N 3/002 248/441.1 |
| 7,233,487 B2 * | 6/2007 | Stinson | ............ | B60R 11/0252 361/679.55 |
| 7,793,597 B2 * | 9/2010 | Bart | ...................... | B60N 3/002 108/44 |
| 8,020,829 B1 * | 9/2011 | Tamayori | .............. | F16M 13/00 108/144.11 |
| 8,272,604 B2 * | 9/2012 | Foster | ................... | F16M 11/28 248/371 |
| 8,511,629 B2 * | 8/2013 | Sullivan | ............... | F16M 11/10 248/291.1 |
| 8,550,013 B2 * | 10/2013 | Carnevali | ................ | F16B 7/14 248/346.03 |
| 9,428,118 B1 * | 8/2016 | Rawlinson | ............ | B60N 3/001 |
| 10,583,740 B2 * | 3/2020 | Ory | ........................ | B60K 35/10 |
| 11,803,300 B2 * | 10/2023 | Park | .................... | G06F 3/04886 |

(Continued)

*Primary Examiner* — Daniel J Rohrhoff
(74) *Attorney, Agent, or Firm* — Derek Fahey; The Plus IP Firm, PLLC

(57) ABSTRACT

A portable table system for mounting within a vehicle to provide a workspace within the vehicle is disclosed. The vehicle has a passenger side and a driver's side, and the system is mounted on the passenger side of the vehicle. The portable table system includes a base plate, a lower portion of a support post attached to the base plate, a bracket attached to an upper portion the support post, and a pair of parallel rails attached to the bracket offset from the support post. The portable tables system further includes a table attached on top of the pair of parallel extension slide rails and a drawer including a first portion having a second table and a second portion having a compartment. The drawer is slidably attached beneath the table such the elongated drawer moves between a first position and a second position.

16 Claims, 12 Drawing Sheets

(56) References Cited

U.S. PATENT DOCUMENTS

| | | | |
|---|---|---|---|
| 2004/0134389 A1* | 7/2004 | Kasak | A47B 21/03 |
| | | | 108/50.01 |
| 2014/0305349 A1* | 10/2014 | Lippert | B60N 3/001 |
| | | | 108/44 |
| 2023/0382285 A1* | 11/2023 | Salter | B60R 11/0252 |
| 2024/0025322 A1* | 1/2024 | Salter | B60K 37/00 |

* cited by examiner

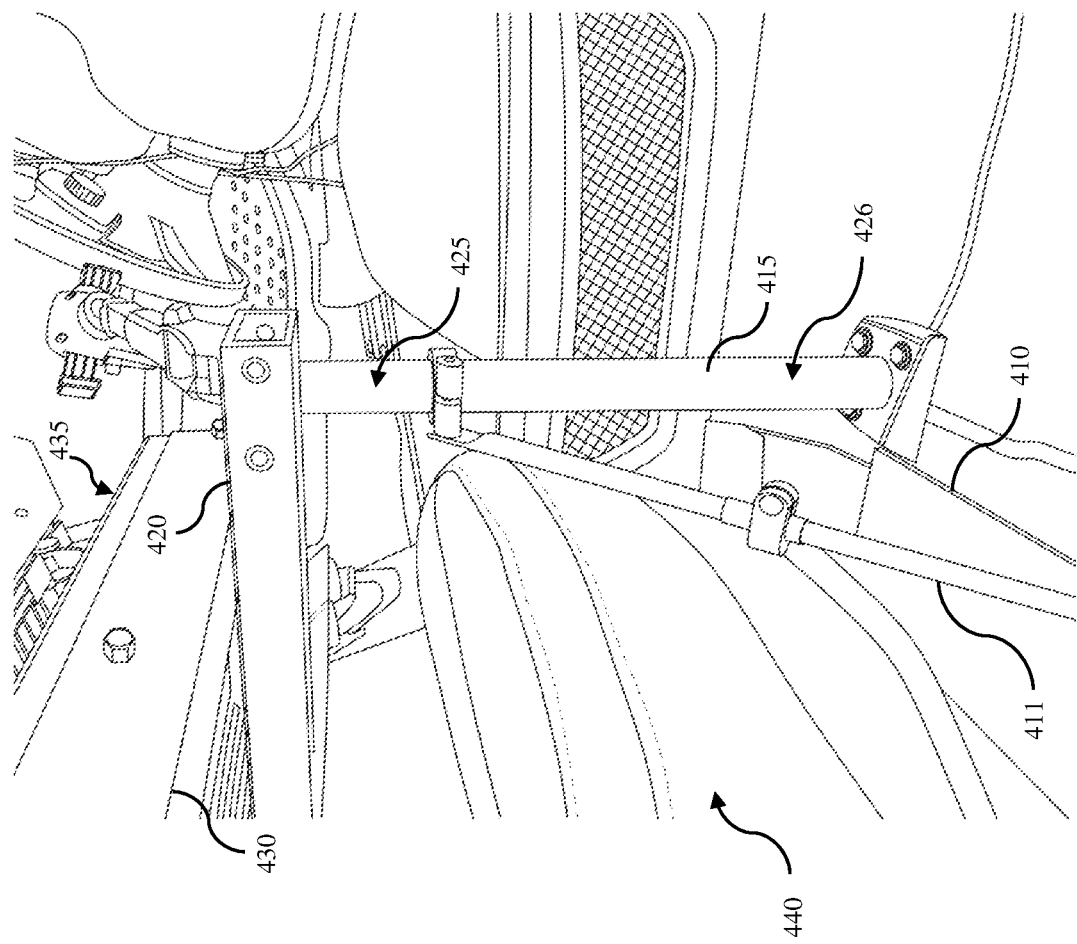

PORTABLE TABLE SYSTEM FOR MOUNTING WITHIN A VEHICLE TO PROVIDE A WORKSPACE WITHIN THE VEHICLE

CROSS-REFERENCE TO RELATED APPLICATIONS

This application claims the benefit of the filing date of U.S. Provisional Application Ser. No. 63/344,753 titled "A PORTABLE TABLE SYSTEM FOR MOUNTING WITHIN A VEHICLE TO PROVIDE A WORKSPACE WITHIN THE VEHICLE" and filed May 23, 2022, and the subject matter of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present disclosure relates to the field of portable tables, and more specifically to the field of portable tables for vehicular use.

BACKGROUND

The ability to work remotely is becoming an increased demand in the workplace. Mobile or remote workers use laptops or other computing devices to do work while traveling for work, so they must find a way to secure their laptops in a comfortable and stable position. Organizing a workplace is also very important for mobile workers so they can efficiently work during stops. Positioning work-related items comfortably allows the mobile worker to work and drive effectively with fewer distractions. The prior art attempts to solve this problem by providing a portable table to create a workspace within the vehicle.

However, the prior art is not sturdy and is not close enough to the driver, so the prior art is not comfortable for a mobile worker. The prior art does not provide a table close enough to the driver such that the driver must turn and slightly twist their back to work. Having to maintain a turned position for some time may cause back pain, which causes more uncomfortableness and may prevent the driver from working efficiently. Although the prior art attempts to position a table close to the driver, the table for the workspace becomes more unstable. The prior art commonly connects a support rod or a post underneath one end of the table, which causes the other end of the table to become unsteady and lag.

Furthermore, the prior art does not increase the workspace area for the mobile worker. The prior art simply provides a small workspace next to the driver, so there is not much room for the driver to work. Therefore, the driver may become more distracted if their workspace is cluttered. Another reason why the prior art provides a smaller workspace is because the prior art doesn't allow for extra storage for work-related items. Most often, the prior art is simply a small table that only fits a laptop and a mouse.

As a result, there exists a need for improvements over the prior art and, more particularly, for a more efficient way of providing a more stable workspace in a vehicle. There is also a need to provide a more spacious and dynamic workspace within a vehicle.

SUMMARY

A portable table system for mounting within a vehicle to provide a workspace within the vehicle is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a portable table system for mounting within a vehicle to provide a workspace within the vehicle is disclosed. The vehicle has a passenger side and a driver's side, and wherein the system is mounted on the passenger side of the vehicle, the portable table system comprising: a base plate; a lower portion of a support post attached to the base plate; a bracket attached to an upper portion the support post; a pair of parallel rails attached to the bracket offset from the support post; a table attached on top of the pair of parallel extension slide rails; a drawer comprising a first portion having a second table and a second portion having a compartment, wherein the drawer is slidably attached beneath the table such the elongated drawer moves between a first position and a second position.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein:

FIG. 4 is a side view of a support post attached to the base plate, according to an example embodiment;

DETAILED DESCRIPTION

Figure 1:
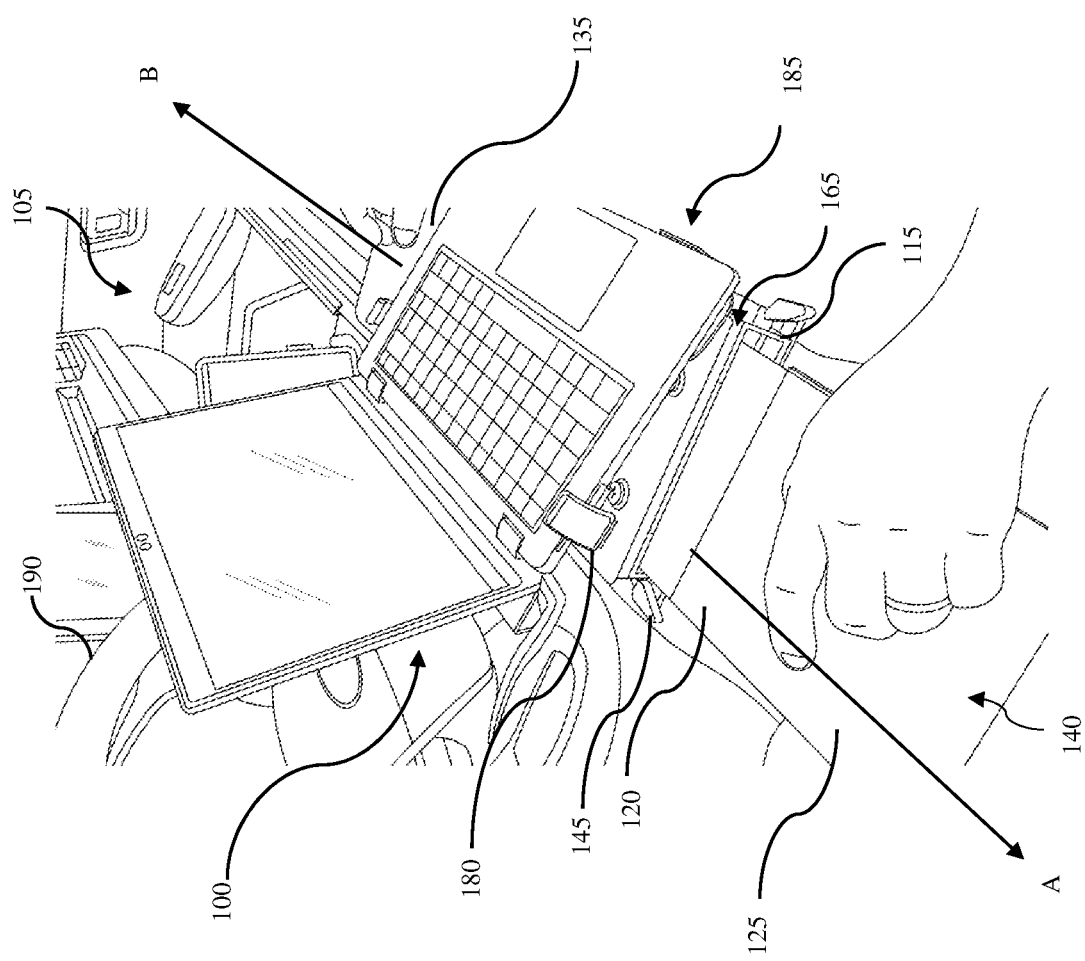
FIG. 1 is a top perspective view of a portable table system, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system that provides a dynamic workplace placement with storage spaces within a vehicle. The system provides a table that may slide closer to the driver side such that the workspace is directly in front of the driver. A more accessible workspace allows the user to work comfortably in a vehicle without hurting themselves from awkward sitting positions. The drawer provides storage allowing for more organization of the vehicular workspace, which may help reduce distractions or loss of work-related items within the vehicle.

Referring now to the Figures, FIG. 1 is a top perspective view of a workspace of a portable table system 100, according to an example embodiment. The portable table system is configured for mounting within a vehicle to provide the workspace within the vehicle. The vehicle has a passenger side 105 and a driver's side 110 (shown in FIG. 2B). The driver's side is the side within the vehicle that includes the steering wheel 190. The passenger side is adjacent to the driver's side, i.e., left or right of the driver's side. The system 100 includes a table 135 that is configured to provide a surface on which the user make work on. The table is attached on top of a pair of slides or a pair of parallel rails 115. The portable table system further includes a laptop bracket 180 attached to the table at a first end portion 185 of the table. The first end portion of the table is the section of the table that is closer to the driver side of the vehicle. The laptop bracket securely holds a laptop such that the laptop is in a fixed position of the table while the table slides. The bottom surface of the table may include wheels to allow the table to slide across the pair of parallel rails. In other embodiments, each rail may include telescoping rails, rail bearings, or ledges to all the rails, and therefore the table and drawer, to extend from the passenger side of the vehicle to the driver's side. Although ledges underneath the table may also be used to hold the drawer, they may not be ideal due to the increased friction. Laptops or other work-related items may be placed on the table. The table may include compartments on the working surface of the table to hold and/or charge computing devices and electronics. The table may include, for example, laptop holders, phone holders, charging pads, outlets, etc. The table may slide in the A direction and the B direction along a track created by the pair of parallel rails. The A direction is towards the driver side of the vehicle, and the B direction is towards the passenger side of the vehicle. The table slides in direction A such that the system is in the extended configuration having the table proximate to, at, or near the steering wheel of the vehicle. As used herein, proximate shall mean closest in relationship to the respective element. The steering wheel of the vehicle is a used as the optimal reference on the driver's side of the vehicle because it is presumably centered over the driver. In another embodiment, the table may extend all the way to the driver's side door such that a laptop on a laptop bracket may be accessed through the driver's side window.

The table may include material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other types of materials may also be used and are within the spirit and scope of the present invention. The table may be formed from a single piece or from several individual pieces joined or coupled together. The components of the table may be manufactured from a variety of different processes including an extrusion process, a mold, welding, shearing, punching welding, folding etc. However, other types of processes may also be used and are within the spirit and scope of the present invention.

The system 100 may also include drawer 120 that may slide in the A direction and/or B direction under the table. The drawer may be in attachment with the pair of rails and/or a second pair of rails and/or in attachment with the table such that as the table moves from the table extended configuration over the driver's side to the table retracted configuration in the passenger's side, the drawer follows suit. As used herein, 'in attachment with" shall mean both a direct and indirect attachments to the respective element so long as the respective elements are operatively coupled. A first end portion 140 of the drawer includes a second table 125 that may extend outwards past a terminating end 165 of the table. That said, the drawer is slidable under the table such that while the table is in the table extended configuration, the second table of the drawer may be extended past the terminating end of the table 165 to the driver's side door. By extending past the terminating end, the second table provides an additional workspace for the user, which, for example, may be used for supporting a computer mouse for a left handed user. When the second table is extended past the terminating end of the table, a second table extended configuration is defined.

The system may also include a locking mechanism 145 that, when enabled, locks at least one of (i) the table, and (ii) the drawer in a fixed position under the table. In a second table extended configuration, the terminating end is extended proximate to the driver's side of the vehicle, and the second table is disposed extending past the terminating end of the table. The table may be locked in the extended configuration preventing the system from sliding into the retracted or stowed configuration on the passenger side of the vehicle. Likewise, when the second table is deployed, the drawer may be locked in the second table configuration to prevent the drawer from any unwarranted sliding.

Similarly, when the table is in the table extended configuration, the drawer may be slid towards the passenger side of the vehicle to access at least one compartment defining a drawer compartment configuration. In one embodiment, the drawer consists of a second table and at least one compartment where the second table extended configuration and the drawer compartment configuration are mutually exclusive. However, in other embodiments, the system may comprise two drawers, wherein one of the drawers comprises at least one of (i) a second table and (ii) at least one compartment, and the other drawer also comprises at least one of (i) a second table and (ii) at least one compartment. This embodiment may allow the user to operate the system in the second table extended configuration and the drawer compartment configuration at the same time.

Figure 2A:
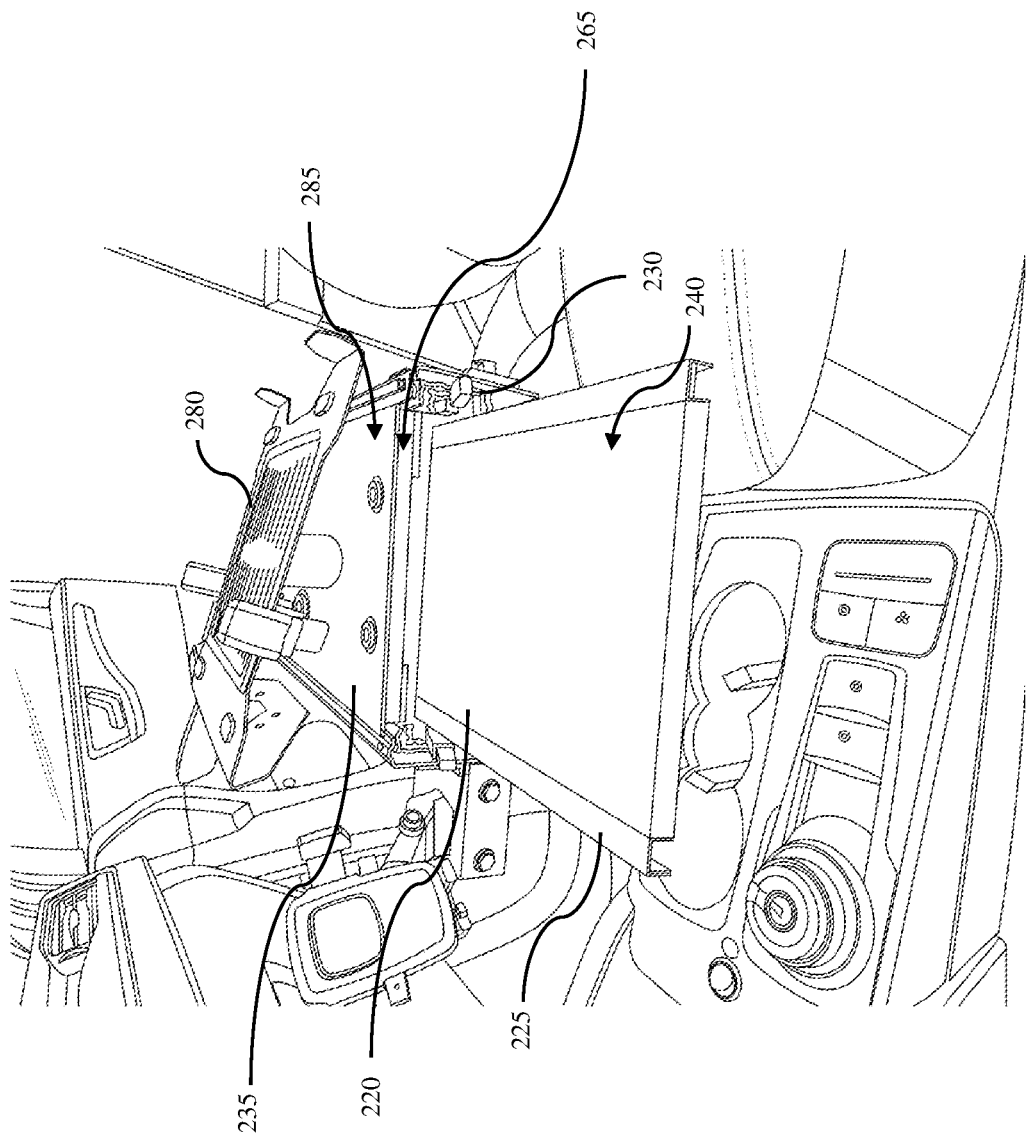
FIG. 2A is a side perspective view of the portable table system, according to an example embodiment.
Figure 2B:
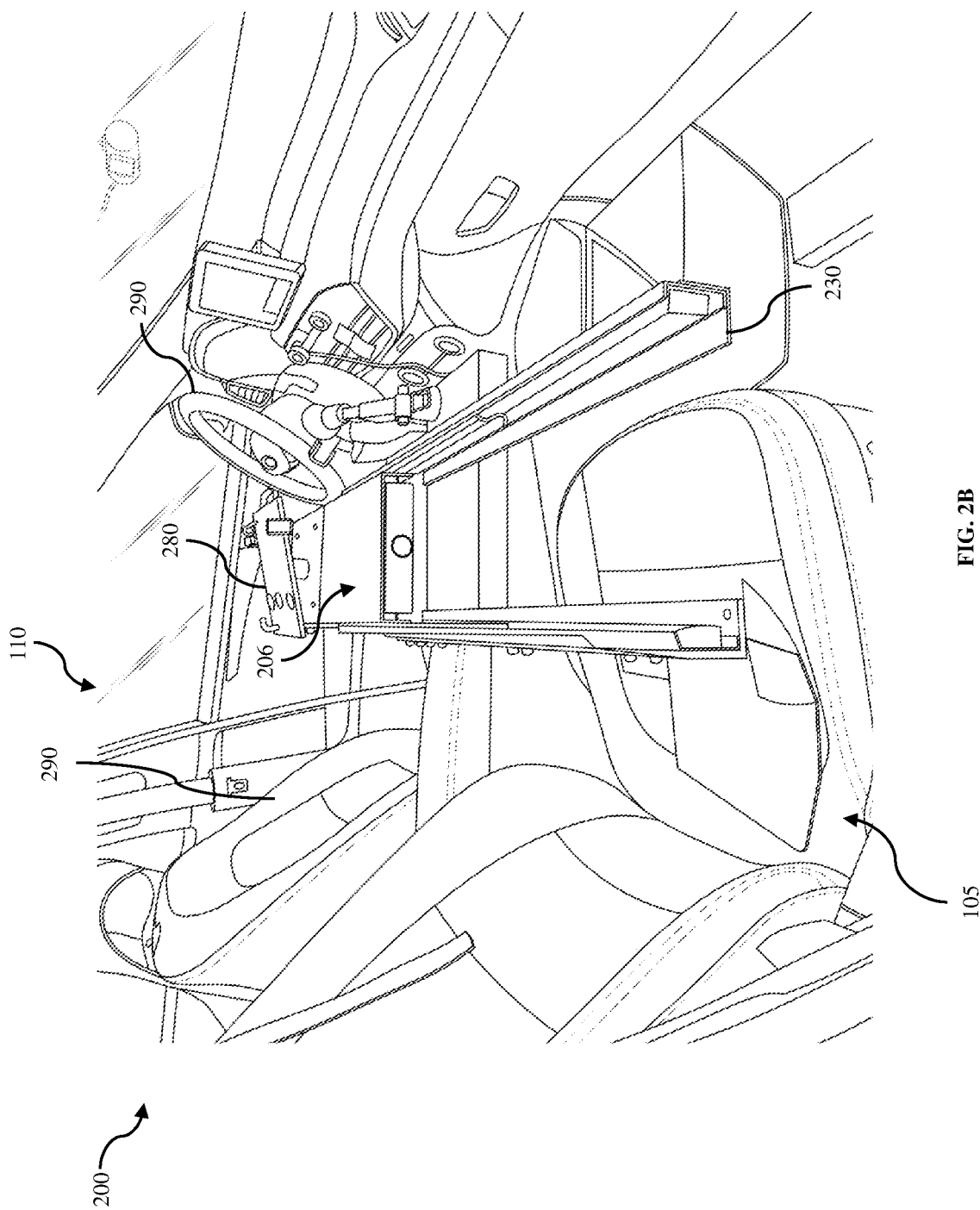
FIG. 2B is a side perspective view of the portable table system looking in through a passenger side window, according to an example embodiment.

Referring now to FIGS. 2A and 2B, side perspective views of the portable table system is shown. FIG. 2A is a side perspective view of the portable table system, wherein the second table 225 is extended outwards from the first end portion 285 of the table, according to an example embodiment. A user may pull on the first end portion 240 of the drawer 220 in the A direction from under the table 235 such that the second table extends outwards from or past the terminating end 265 of the table. The first end portion 285 of the table includes the terminating end of the table and the terminating end of the table is defined by the edge of the table closest to the driver's side of the vehicle.

FIG. 2B is a side perspective view of the portable table system in a table extended configuration 200, according to an example embodiment. In the table extended configuration, the laptop bracket 280 is positioned proximate to the driver's side 110 of the vehicle such that the laptop bracket is in between the steering wheel 290 and the driver seat 291. The second portion 206 of the table may be freely used as a workspace. In certain embodiments, neither the first portion nor the second portion of the table may be fit with a laptop bracket and the entire table may be a freely designated desktop for working. For example, the user may place a mouse pad and a mouse for the laptop.

The table extended configuration allows the laptop bracket to be disposed between the seat in the driver side and the steering wheel such that the laptop bracket is directly in front of the driver in the vehicle. In the table extended configuration, the user in the driver side may use the laptop in a comfortable position. The table extended configuration may be used while the vehicle is stopped with the user in the driver seat. In other embodiments, the system may be installed in the cabin of the vehicle for passengers to use while the vehicle is in motion, such as those passengers in the backseat behind the driver.

The laptop bracket 280 is configured to secure a laptop on top of the table for the driver. The laptop bracket may include material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other types of materials may also be used and are within the spirit and scope of the present invention. The laptop bracket may be formed from a single piece or from several individual pieces joined or coupled together. The components of the laptop bracket may be manufactured from a variety of different processes including an extrusion process, a mold, welding, shearing, punching welding, folding etc. However, other types of processes may also be used and are within the spirit and scope of the present invention.

Shown in FIG. 2B, a pair of parallel rails 230 are attached to the bracket. The pair of parallel rails are a pair of extension slide rails that are comprised of one or more interlocking and/or telescoping rails to provide an increase structural support mechanism in carrying and ensuring straight, linear sliding motions. The pair of parallel rails is at least two bars positioned parallel to each other to create a track that allows the table to traverse back-and-forth towards the driver side or towards the passenger side. The pair of parallel rails are attached to the top side of the bracket and to the bottom side of the table. The parallel rails may include material such as carbon steel, stainless steel, aluminum, Titanium, or other metals or alloys. However, other types of materials may also be used and are within the spirit and scope of the present invention. The parallel rails may be formed from a single piece or from several individual pieces joined or coupled together. The components of the parallel rails may be manufactured from a variety of different processes including an extrusion process, a mold, welding, shearing, punching welding, folding etc. However, other types of processes may also be used and are within the spirit and scope of the present invention.

Figure 3A:
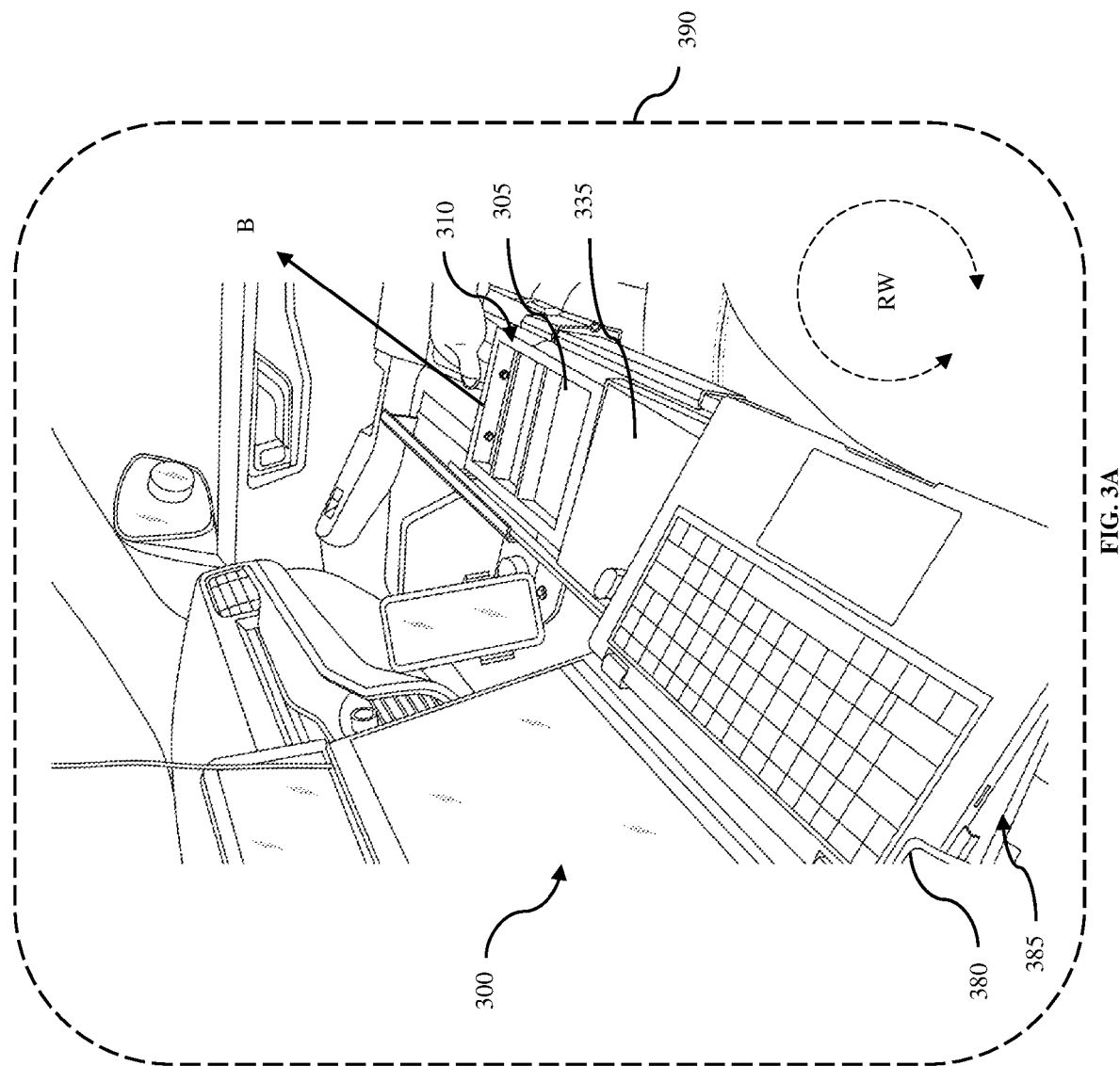
FIG. 3A is a side perspective view of the portable table system, according to an example embodiment.
Figure 3B:
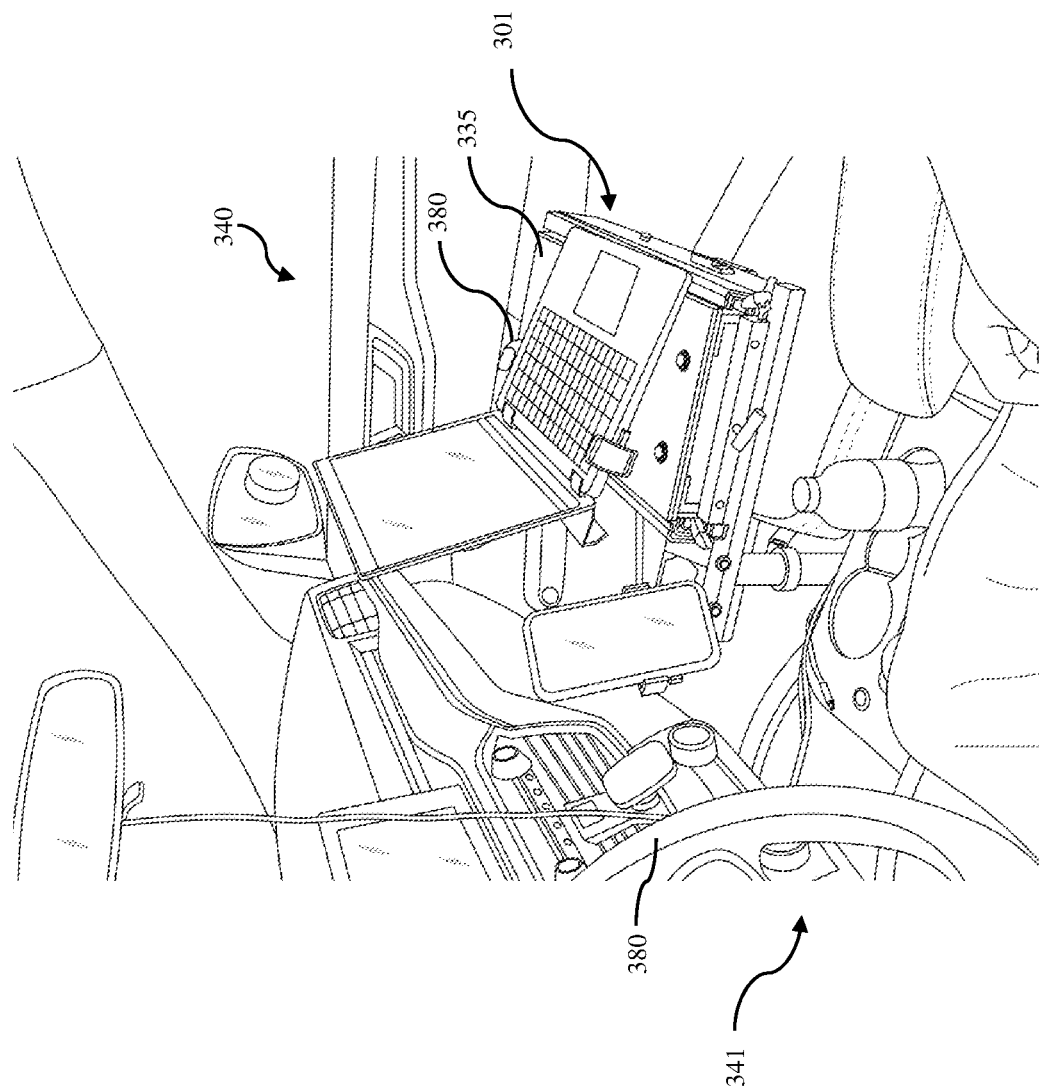
FIG. 3B is a side perspective view of the portable table system, according to an example embodiment.

Referring now to FIGS. 3A and 3B, side perspective views of the portable table system are shown, according to an example embodiment. FIG. 3A is a side perspective view of the portable table system in a table extended configuration 300, according to an example embodiment. A rotatable laptop bracket 380 is attached the table at the first end portion 385 of the table 335 proximate to the terminating end of the table. In the table extended configuration, the laptop bracket is positioned proximate to a steering wheel 390 disposed in the driver's side of the vehicle. The table extended configuration may have a first position having the laptop bracket proximate to the steering wheel and a second position having the laptop bracket proximate to the driver's side window. The laptop bracket may be rotatable in the RW direction. The plane of the RW direction is parallel with the plane of the A and B directions. Rotating the laptop bracket can be useful to those working outdoors often or those needing more portability in their workstation. By having the laptop bracket rotate, the user can access and utilize the laptop easily from outside the vehicle through the vehicle's window 390, in when the table is in the table extended configuration, and in the second position. Because the table may slide from the passenger side to the driver's side, the user has more mobility in their workstation. The drawer also includes at least one compartment 305 at a second end portion 310 of the drawer. The compartment is a recess and/or divided section of the drawer having at least one open side to access and store items within the compartment. The user may pull on the second end portion of the drawer in the B direction to extend the compartment outwards from the table 335 such that the user may store or receive items within the compartment.

FIG. 3B is a side perspective view of the portable table system in a table retracted configuration 301, according to an example embodiment. In the table retracted configuration, the laptop bracket 380 is positioned proximate to the passenger side 340 of the vehicle. The edge of the laptop bracket facing the driver side 341 may be disposed in between the driver side and the passenger side or in the passenger side in the table retracted configuration. The table retracted configuration allows the user to enter the vehicle and operate the vehicle because the table 235 is not directly in front of the driver. However, the laptop bracket is still within the reach of the driver in the table retracted configuration.

Referring now to FIG. 4 is a side view of a support post 415 attached to the base plate 410, according to an example embodiment. The system is mounted on the passenger side of the vehicle by configuring a base plate 410, a support post 415, and a bracket 420 to provide support for the workspace. The base plate and the support post define a mounting system that is pre-existing in a vehicle. The present invention is able to attach to and/or is mountable to said mounting or support system. The bracket is configured to attach to said pre-existing mounting system. The base plate is positioned underneath the seat in the passenger side 440. Part of the base plate extends out from under the seat in the passenger side such that the lower portion 426 of the support post 415 can be attached to the base plate 410. The base plate uses the passenger seat as an anchor to prevent movement. The base plate may be in attachment with a diagonal beam 411 that is also in attachment with the upper portion 425 of the support post. Also shown in FIG. 4, a lower portion 426 of a support post is attached to the base plate, and the bracket is attached to an upper portion 425 the support post.

The diagonal beam further helps the support post maintain its vertical position and provides increased structural rigidity to allow the table to be attached on top of the support bracket thereby preventing operational sagging. The diagonal beam may include material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. The diagonal beam may also be used and are within the spirit and scope of the present invention. The diagonal beam may be formed from a single piece or from several individual pieces joined or coupled together. The diagonal beam may be merged with at least one of support post and the base plate during the process of creating the at least one of support post and the base plate or in attachment with the at least one of support post and the base plate as a separate entity. The components of the diagonal beam may be manufactured from a variety of different processes including an extrusion process, a mold, welding, shearing, punching welding, folding etc. However, other types of processes may also be used and are within the spirit and scope of the present invention.

The support post may include at least one fastener that allows for attachment between the support post and the bracket. The at least one fastener may include bolts, set crews, an opening configured to attached to protruding element, socket screws, etc. However, other types of fasteners may also be used and are within the spirit and scope of the present invention. The fastener may include material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other types of materials may also be used and are within the spirit and scope of the present invention. The fastener may be formed from a single piece or from several individual pieces joined or coupled together. The components of the fastener may be manufactured from a variety of different processes including an extrusion process, a mold, welding, shearing, punching welding, folding etc. However, other types of processes may also be used and are within the spirit and scope of the present invention.

The base plate 410 is configured to be positioned on the floor proximate to the front passenger side of the vehicle. The base plate reinforces the support post to keep the support post steady and upright. The base plate is positioned on the floor of the front passenger side of the vehicle. In some embodiments, the base plate may extend underneath the front passenger seat. The base plate may include material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other types of materials may also be used and are within the spirit and scope of the present invention. The base plate may be formed from a single piece or from several individual pieces joined or coupled together. The components of the base plate may be manufactured from a variety of different processes including an extrusion process, a mold, welding, shearing, punching welding, folding etc. However, other types of processes may also be used and are within the spirit and scope of the present invention.

The support post 415 is a vertical pole or rod that holds up the table. The support post is elongated and arranged perpendicularly to the base plate. The support post may include material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other types of materials may also be used and are within the spirit and scope of the present invention. The support post may be formed from a single piece or from several individual pieces joined or coupled together. The support post may be merged with the base plate during the process of creating the base plate or in attachment with the base plate as a separate entity. The components of the support post may be manufactured from a variety of different processes including an extrusion process, a mold, welding, shearing, punching welding, folding etc. However, other types of processes may also be used and are within the spirit and scope of the present invention.

The bracket 420 is configured to maintain a connection between the pair of parallel rails 430 and the support post. The bracket provides support to the pair of parallel rails and the table. This helps the table 435 remain more rigid, providing a more stable workstation compared to the prior art. The bracket is generally a metal, u-shaped bracket attached to the support post at one end of the bracket and wherein the table is attached on top of the bracket at the opposing end portion. The bracket may include material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other types of materials may also be used and are within the spirit and scope of the present invention. The bracket may be formed from a single piece or from several individual pieces joined or coupled together. The bracket may be merged with the support post during the process of creating the support post or in attachment with the support post as a separate entity. The components of the bracket may be manufactured from a variety of different processes including an extrusion process, a mold, welding, shearing, punching welding, folding etc. However, other types of processes may also be used and are within the spirit and scope of the present invention. The table attachment to the bracket is shown in FIG. 5, and further discussed below.

Figure 5:
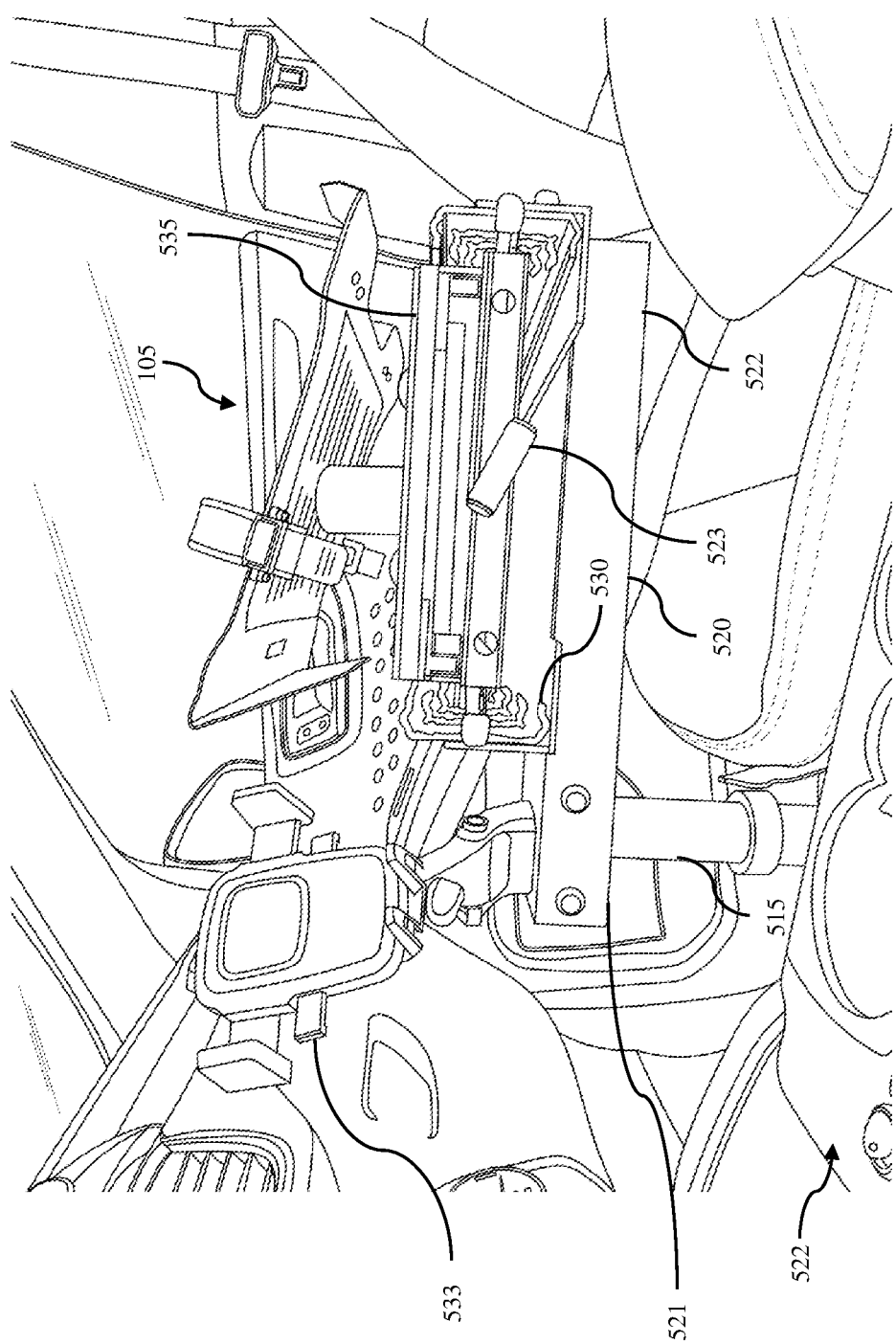
FIG. 5 is a side view of a bracket attached to a support post, according to an example embodiment.

Referring now to FIG. 5 is a side view of a bracket 520 attached to a support post 515, according to an example embodiment. The bracket holds the pair of parallel rails 530 to provide more reinforcement for the table 535. The bracket prevents the table and the parallel rails from being unstable from multiple items being placed on the table or movement of the vehicle. The bracket does not extend into the passenger side but may partially extend into the driver side. The bracket has a first bracket portion 521, and a second bracket portion 522. The extension slide rails are attached to the top surface of the bracket within the second bracket portion. The support post being attached to the first portion acts as a counterweight/countersupport for the weight of the table attached on top of the bracket at the second portion of the bracket thereby preventing any operational sag. The support post is connected to the bracket at the first bracket portion 521. The support post 515 may be a height that is tall enough such that the bracket is at least substantially above the seat in the driver side and above the center space 522 in between the driver's side and the passenger side 105. In some embodiments, the support post may have an adjustable height through a piston and/or telescoping mechanism. Substantially above the seat in the driver side means that the height of the support post allows the bracket to hold the table above the legs of the user when the user sits in the driver seat. In other embodiments, the support post may be adjustable to fit the needs of the user.

FIG. 5 illustrates a stopping mechanism 523 that is used for holding the pair of rails in place. This may be useful to the driver when driving the vehicle. As the car is moving and turning, the table and workspace must be secured to prevent any distractions of possible accidents. This stopping mechanism will hold the table in place by stopping the parallel rails from extending, also known as a locked state. Once the user stops his or her vehicle the stopping mechanism will be disengaged allowing the parallel rails to be in a free state. Both the table and the drawer may be engaged between a free state and a locked stated. The free state means that at least one of the (i) table and (ii) the drawer may freely slide between its respective configurations. The locked state means that at least one of the (i) table and (ii) the drawer are locked, not able to move unless unlocked, in a set position within at least one of its respective configurations. In the present embodiment, the system includes a cell phone holder 533. The cell phone holder may be in attachment with the table or the bracket. The cell phone holder may be in the form of a clamp, or the cell phone holder may be magnetic. The holder may attach to the system by use of adhesive, magnetic force, bolt or screws, hook and loop elements, etc. Other forms of holding apparatuses may also be used and are within the spirit and the scope of the present invention.

Figure 6:
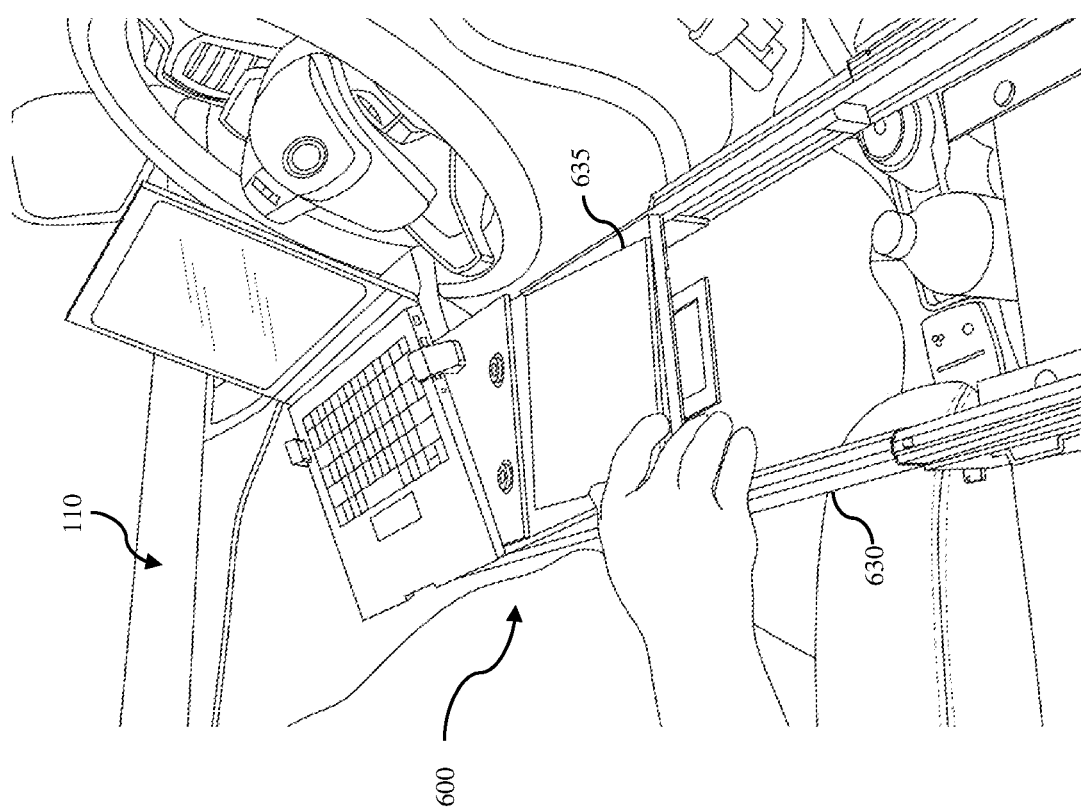
FIG. 6 is a side perspective view of a table, according to an example embodiment.
Figure 7A:
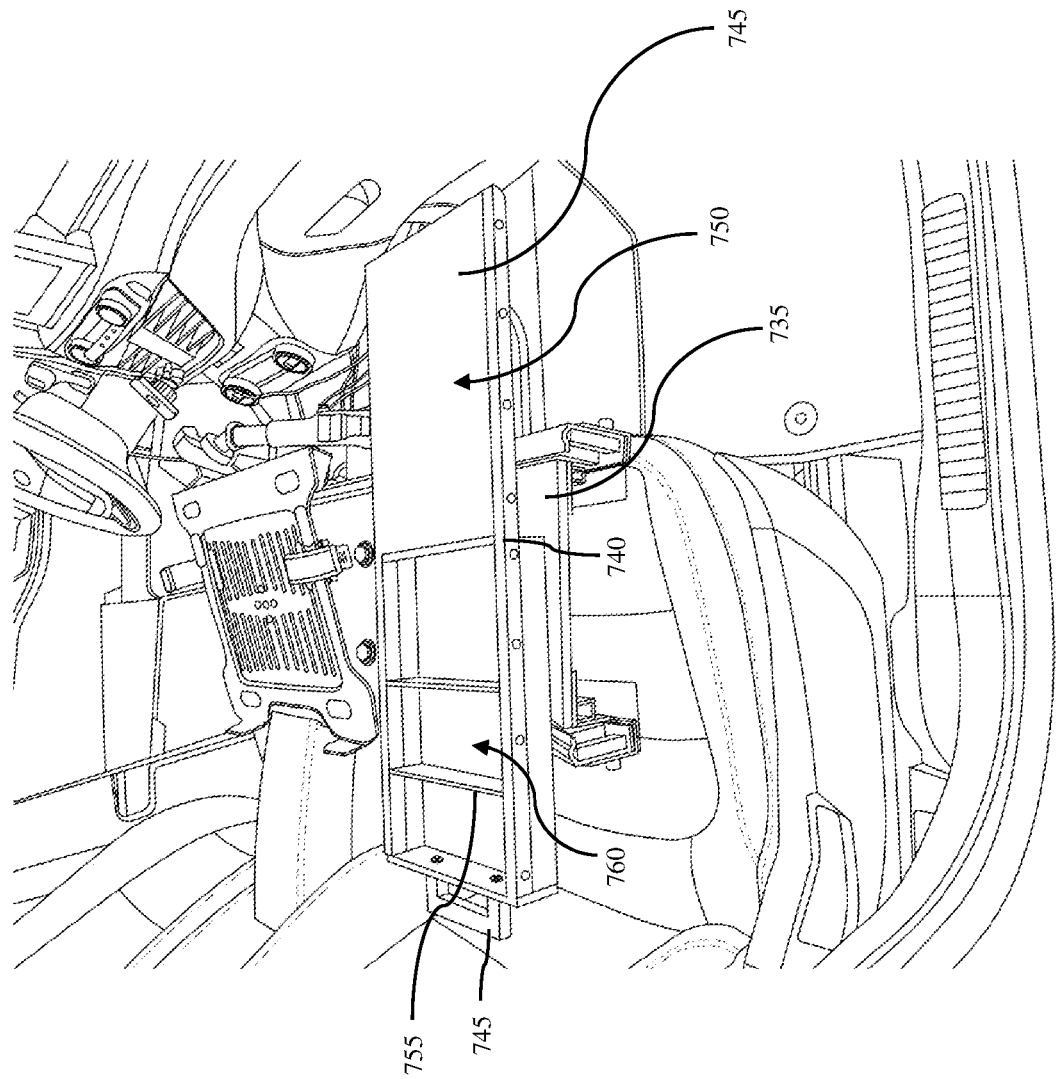
FIG. 7A is a side perspective view of the drawer, according to an example embodiment.
Figure 7C:
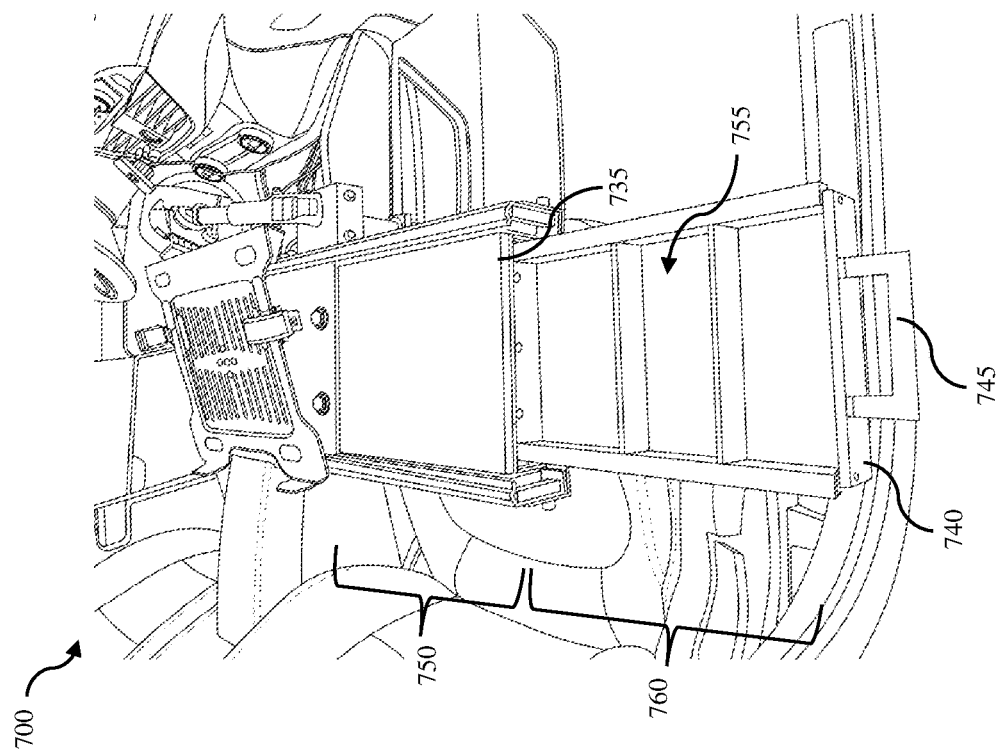
FIG. 7C is a top perspective view of the portable table system including the drawer in the first position, according to an example embodiment.
Figure 7B:
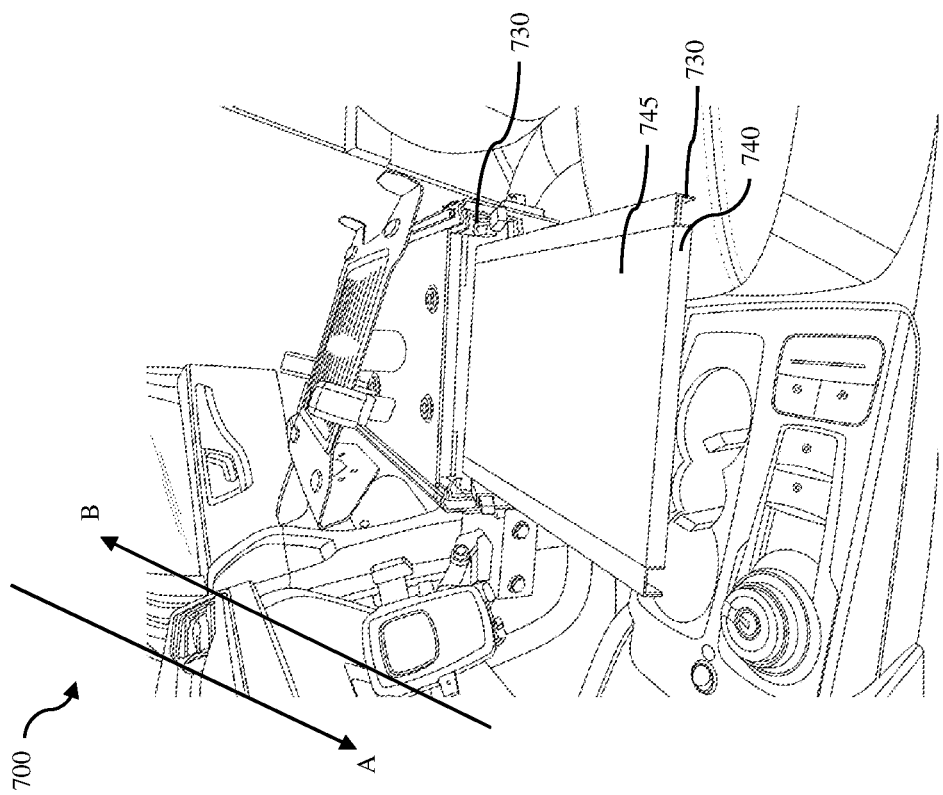
FIG. 7B is a side perspective view of the portable table system including the table in a table extended configuration, according to an example embodiment.
Figure 7D:
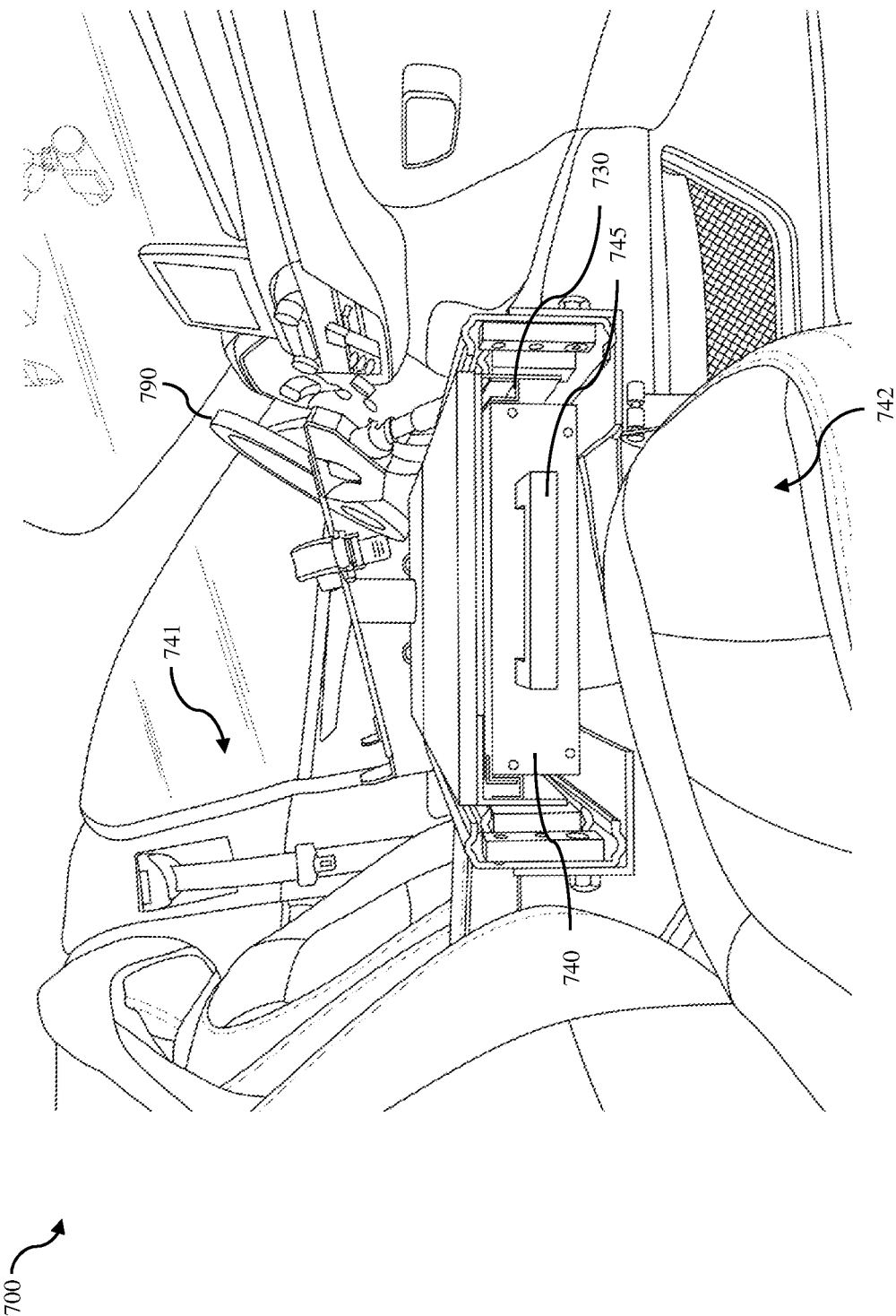
FIG. 7D is a side view of the portable table system, according to an example embodiment.

Referring now to FIGS. 6-7D, views of the portable table system are shown, according to an example embodiment. FIG. 6 is a side view of a portable table system in a table extended configuration 600, according to an example embodiment. The portable table system is configured for attaching to a workstation mounting system within a vehicle to provide a workspace within the vehicle. The workstation mounting system is mounted on the passenger side of the vehicle. The workstation mounting system is configured to support the portable table system to provide a steady and stable workspace. The mounting system is any of the support elements described in FIG. 4 and may be pre-existing in the car. The portable table system includes the pair of extension slide rails 630 attached to the workstation mounting system, the table 635 attached to the pair of extension slide rails, and the drawer 740, shown in FIG. 7A. The drawer includes a first end portion 750 including a second table 745 and a second end portion 760 including a compartment 755. The drawer is slidably attached beneath the table. The portable table system further includes a retracted configuration that includes the table positioned proximate to the passenger side of the vehicle. The portable table system also includes an extended configuration, in which the laptop bracket is positioned proximate to the driver's side of the vehicle.

FIG. 7A is a side perspective view of the drawer 740, according to an example embodiment. FIG. 7B is a top perspective view of the portable table system 700 including the drawer in the second position, according to an example embodiment. FIG. 7C is a top perspective view of the portable table system 700 including the drawer 740 in the first position, according to an example embodiment. FIG. 7D is a side view of the portable table system 700, according to an example embodiment. The table includes a second pair of parallel rails 730, which creates a second track that allows the drawer to be slidably attached to the table 735 to allow the user to shift the drawer to different positions. The first portion 750 of the drawer includes the second table 745, and the second portion 760 of the drawer includes the compartment 755. The first portion is closer to the driver side 741 while the second portion 760 is closer to the passenger side 742. In other embodiments, the first portion may be closer to the passenger side while the second portion may be closer to the driver side. In the first position, the compartment is extended beyond the table towards the passenger side of the vehicle. In the first position, the second table is underneath the table, and the compartment is protruded such that the user may store or retrieve items from the compartment. In the second position, the second table is extended beyond the first end portion of the table towards the driver side of the vehicle. In the second position, the compartment is underneath the table such that the compartment is enclosed, and the items within the compartment are secure. Additionally, the second table is extended outwards from the table towards the driver side to allow for more workspace area. The drawer may be disposed in other positions along the second track underneath the table such that the second table and drawer are enclosed by the table and such that the drawer provides an opening to a storage compartment and a second table for the user. The second portion of the drawer may include a handle 745 that allows the user to pull the drawer to the first position towards the passenger side. In other embodiments, the second portion may include a knob or any element that the user may hold or grip to allow the user to slide the drawer. The knob allows the user to slide the drawer in the A and B directions along the second track. In a drawer compartment configuration, the compartment may include a plurality of slats or dividers that allow the user to organize their items within the compartment. In other embodiments, the compartment may not include slats or dividers to store wider or longer items such as notebooks or other items, yet the compartment is accessible through an opening on the top side of the drawer.

As shown in FIG. 7A, the portable table system also includes the drawer 740, which includes a first portion 750 having a second table 745 and a second portion 760 having a compartment 755. The drawer is slidably attached beneath the table such that the elongated drawer moves between a first position and a second position. The parallel rails have a table retracted configuration and a table extended configuration. Slidably attached means that the drawer may slide under the table to allow the user of the portable table system to open and close the drawer.

The drawer 740 is configured to provide storage space for items in the workspace. The drawer includes an enclosed space with an opening. The drawer may include material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other types of materials may also be used and are within the spirit and scope of the present invention. The drawer may be formed from a single piece or from several individual pieces joined or coupled together. The components of the drawer may be manufactured from a variety of different processes including an extrusion process, a mold, welding, shearing, punching welding, folding etc. However, other types of processes may also be used and are within the spirit and scope of the present invention.

The second table 745 provides more workspace area for the user. The second table may also allow left-handed users to place a mousepad and a mouse. The second table may include materials similar to the table. The second table may include material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. However, other types of materials may also be used and are within the spirit and scope of the present invention. The second table may be formed from a single piece or from several individual pieces joined or coupled together. The components of the second table may be manufactured from a variety of different processes including an extrusion process, a mold, welding, shearing, punching welding, folding etc. However, other types of processes may also be used and are within the spirit and scope of the present invention.

Figure 8:
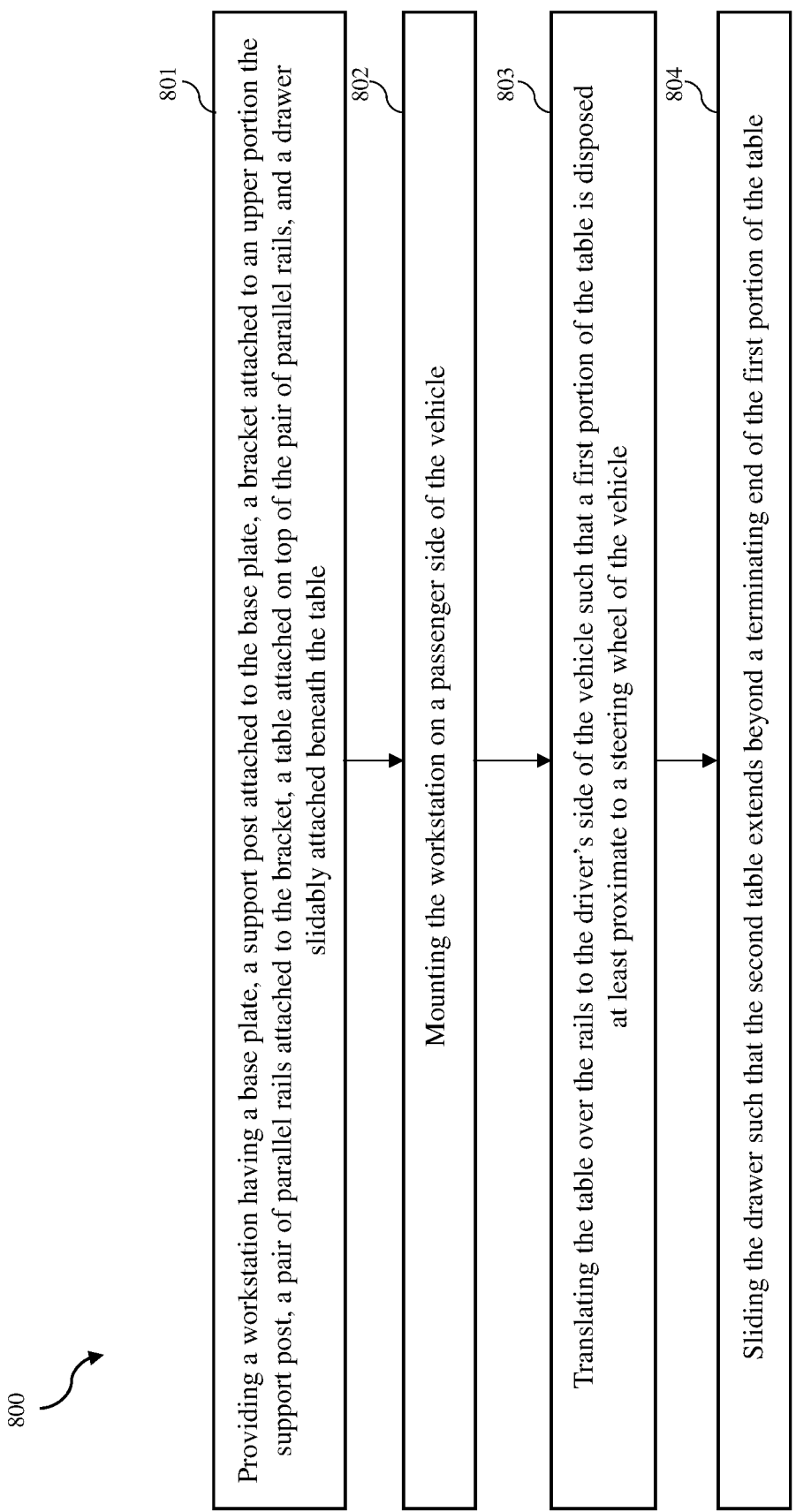
FIG. 8 is a flow chart illustrating a method for providing a remote workstation for a driver seated in the driver's side of a vehicle, according to an example embodiment.

FIG. 8 is a flow chart illustrating a method 800 for providing a remote workstation for a driver seated in the driver's side of a vehicle. First the method begins with step 801. Step 801 is having a workstation including a base plate, a support post attached to the base plate, a bracket attached to an upper portion the support post, a pair of parallel rails attached to the bracket, a table attached on top of the pair of parallel rails, and a drawer slidably attached beneath the table comprising. The drawer having a second table at a first end portion of the drawer and at least one compartment at a second end portion of the drawer. Next, in step 802, the user will mount the workstation on a passenger side of the vehicle. Next, in step 803, the user will translate the table over the rails to the driver's side of the vehicle such that a first portion of the table is disposed at least proximate to a steering wheel of the vehicle.

Lastly, in step 804, the user may slide the drawer such that the second table extends beyond a terminating end of the first portion of the table. The user may slide the drawer towards the passenger side of the vehicle so that the compartment may extend beyond a second terminating end of a second portion of the table. By engaging the pair of parallel rails, the table is allowed to slide between a table stowed configuration and a table extended configuration. Once the workspace is in the preferred orientation, the user may lock the pair of extension slide rails at a first position defined by the first portion of the table being disposed in front of the steering wheel of the vehicle, or the user may lock the pair of extension slide rails at a second position defined by the first portion of the table being disposed adjacent to a driver's side door of the vehicle.

By way of example, a user may need a workstation in their vehicle to work while travelling. Initially, the portable table system may be in the table retracted configuration (shown in FIG. 3B) which is proximate to the passenger side of the vehicle and/or direction B described herein. The user may provide a force on the table, e.g., using the stopping/locking mechanism or lever 523 in FIG. 5, to engage the locking/unlocking mechanism in connection with the extension slide rails to allow the table to move in the direction of the driver's side (direction A) of the vehicle thereby sliding along the tracks. In this extended configuration shown in FIG. 6, the table is positioned in front of the driver such that the laptop bracket is disposed proximate to the steering wheel on the driver's side of the vehicle and presumably in front of the driver. As shown in FIG. 3A, the user may also provide a second force on the knob in the B direction to slide the drawer along the second track to the first position to store or retrieve items from the compartments. The compartments allow the user to organize work-related items. The user may provide the force on the knob in the A direction to slide the compartment back underneath the table. The user may provide a second force on the table in the B direction to slide the table to the passenger side in the table retracted configuration if the user wants to operate the vehicle, as shown in FIG. 3B. If the user wants to work, the user may instead keep the table in the table extended configuration. The user may also provide the second force on the drawer in the A direction to slide the drawer along the second track to the second position to allow the second table to extend outwards, as shown in FIG. 7B. The second table offers more space for the workstation if the user uses other items for work other than a laptop. The second table extends past the terminating end of the table to provide a longer workstation. This second table is also advantageous to left-handed users that require a workstation proximate to their dominant hand. Even with the second table extended and the table positioned in front of the user, the base plate, support post, and bracket reinforce the table to stay steady so that the user may comfortably work. The table is further supported because the entire workstation is attached to the support bracket on the top side of the bracket. Unlike the prior art, the present invention prevents sagging of the workstation and provides a sturdy, secure workstation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A portable table system for mounting within a vehicle to provide a workspace within the vehicle, wherein the vehicle has a passenger side and a driver's side, and wherein the portable table system is mounted on the passenger side of the vehicle, the portable table system comprising:
   a. a base plate;
   b. a support post attached to the base plate;
   c. a bracket attached to an upper portion of the support post;
   d. a pair of parallel rails attached to the bracket;
   e. a table attached on top of the pair of parallel rails;
   f. a drawer slidably attached beneath the table comprising
      (i) a second table at a first end portion of the drawer and
      (ii) at least one compartment at a second end portion of the drawer;
   a table extended configuration comprising the table having a terminating end being extended proximate to the driver's side of the vehicle and the second table disposed extending past the terminating end of the table, wherein the pair of parallel rails have a table retracted configuration and the table extended configuration; and
   a rotatable laptop bracket attached to the table at a first end portion of the table proximate to the terminating end of the table, wherein, in the table retracted configuration the rotatable laptop bracket is positioned proximate to the passenger side of the vehicle; and wherein, in the table extended configuration, the rotatable laptop bracket is positioned proximate to a steering wheel disposed in the driver's side of the vehicle.

2. The portable table system of claim 1 comprising a drawer compartment configuration comprising the at least one compartment of the drawer extending beyond a second terminating end of the table.

3. The portable table system of claim 1 wherein the pair of parallel rails comprises a free state and a locked state.

4. The portable table system of claim 1 comprising a cell phone holder.

5. A portable table system for attaching to a workstation mounting system within a vehicle to provide a workspace within the vehicle, wherein the vehicle has a passenger side and a driver's side, and wherein the workstation mounting system is mounted on the passenger side of the vehicle, the portable table system comprising:
 a. a pair of extension slide rails attached to the workstation mounting system;
 b. a table attached to the pair of extension slide rails;
 c. a drawer slidably attached beneath the table comprising (i) a second table at a first end portion and (ii) at least one compartment at a second end portion; and
 a table retracted configuration having a laptop bracket positioned proximate to the passenger side of the vehicle; and
 a table extended configuration having the laptop bracket positioned proximate to a steering wheel disposed in the driver's side of the vehicle.

6. The portable table system of claim 5, further comprising a second table extended configuration comprising the table having a terminating end being extended proximate to the driver's side of the vehicle and the second table disposed extending past the terminating end of the table.

7. The portable table system of claim 5, wherein the pair of extension slide rails have a table retracted configuration and a table extended configuration.

8. The portable table system of claim 5 comprising a rotatable laptop bracket attached to the table at a first end portion of the table proximate to a terminating end of the table.

9. The portable table system of claim 5 comprising a drawer compartment configuration comprising the at least one compartment of the drawer extending beyond a second terminating end of the table.

10. The portable table system of claim 5 comprising a cell phone holder.

11. The portable table system of claim 5 wherein the pair of extension slide rails comprises a free state and a locked state.

12. A method for providing a remote workstation for a driver seated in a driver's side of a vehicle, the method comprising:
 a. providing a workstation comprising: (i) a base plate; (ii) a support post attached to the base plate; (iii) a bracket attached to an upper portion the support post; (iv) a pair of parallel rails attached to the bracket; (v) a table attached on top of the pair of parallel rails; and (vi) a drawer slidably attached beneath the table comprising (1) a second table at a first end portion of the drawer and (2) at least one compartment at a second end portion of the drawer, wherein the pair of parallel rails have a table retracted configuration having a rotatable laptop bracket positioned proximate to a passenger side of the vehicle, and a table extended configuration having the rotatable laptop bracket positioned proximate to a steering wheel disposed in the driver's side of the vehicle;
 b. mounting the workstation on the passenger side of the vehicle;
 c. translating the table over the pair of parallel rails to the driver's side of the vehicle such that a first portion of the table is disposed at least proximate to a steering wheel of the vehicle in the table extended configuration; and
 d. sliding the drawer such that the second table extends beyond a terminating end of the first portion of the table in the table extended configuration.

13. The method of claim 12 further comprising sliding the drawer towards the passenger side of the vehicle such that the at least one compartment extends beyond a second terminating end of a second portion of the table.

14. The method of claim 13 further comprising engaging the pair of parallel rails to slide between a table stowed configuration and a table extended configuration.

15. The method of claim 14 further comprising locking the pair of parallel rails at a first position defined by the first portion of the table being disposed in front of the steering wheel of the vehicle.

16. The method of claim 15 further comprising locking the pair of parallel rails at a second position defined by the first portion of the table being disposed adjacent to a driver's side door of the vehicle.

* * * * *